United States Patent
Zhang et al.

(10) Patent No.: US 9,995,964 B2
(45) Date of Patent: Jun. 12, 2018

(54) LIQUID CRYSTAL DISPLAY PANEL AND DISPLAY DEVICE

(71) Applicant: BOE TECHNOLOGY GROUP CO., LTD., Beijing (CN)

(72) Inventors: Bin Zhang, Beijing (CN); Tingting Zhou, Beijing (CN); Zhijun Lv, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 126 days.

(21) Appl. No.: 14/906,421

(22) PCT Filed: Jun. 11, 2015

(86) PCT No.: PCT/CN2015/081210
§ 371 (c)(1),
(2) Date: Jan. 20, 2016

(87) PCT Pub. No.: WO2016/112621
PCT Pub. Date: Jul. 21, 2016

(65) Prior Publication Data
US 2016/0370656 A1    Dec. 22, 2016

(30) Foreign Application Priority Data

Jan. 16, 2015  (CN) .......................... 2015 1 0024239

(51) Int. Cl.
*G02F 1/1335*    (2006.01)

(52) U.S. Cl.
CPC ...... *G02F 1/133617* (2013.01); *G02F 1/1335* (2013.01); *G02F 1/133514* (2013.01);
(Continued)

(58) Field of Classification Search
None
See application file for complete search history.

(56) References Cited

U.S. PATENT DOCUMENTS

| | | | |
|---|---|---|---|
| 2006/0169971 A1* | 8/2006 | Cho ....................... | B82Y 10/00 257/14 |
| 2008/0258079 A1* | 10/2008 | Bratkovski ............ | B82Y 20/00 250/486.1 |

(Continued)

FOREIGN PATENT DOCUMENTS

| CN | 103258871 A | 8/2013 |
|---|---|---|
| CN | 103278961 A | 9/2013 |

(Continued)

OTHER PUBLICATIONS

International Search Report issued in International Application No. PCT/CN2015/081210 along with an English translation of the Written Opinion of the International Searching Authority.

(Continued)

*Primary Examiner* — Ryan Crockett
(74) *Attorney, Agent, or Firm* — Nath, Goldberg & Meyer; Joshua B. Goldberg; Stanley N. Protigal

(57) ABSTRACT

The present invention relates to a liquid crystal display panel and a display device. The liquid crystal display panel comprises a first substrate and a second substrate assembled in an aligned manner, and further comprises a reflecting layer, a light wavelength conversion layer and a quantum dot layer; the reflecting layer is provided on the second substrate, the quantum dot layer is provided on the first substrate or the second substrate, and the reflecting layer and the quantum dot layer are arranged in a direction from the second substrate to the first substrate; the light wavelength conversion layer is made from an upconversion material and provided between the reflecting layer and the quantum dot layer. The above liquid crystal display panel has a higher utilization of ambient light, and thus has higher brightness and contrast ratio.

18 Claims, 2 Drawing Sheets

(52) U.S. Cl.
CPC .. *G02F 1/133553* (2013.01); *G02F 1/133621* (2013.01); *G02F 2001/133614* (2013.01); *G02F 2001/133616* (2013.01); *G02F 2001/133618* (2013.01); *G02F 2202/36* (2013.01); *G02F 2203/05* (2013.01)

(56) References Cited

U.S. PATENT DOCUMENTS

| | | | |
|---|---|---|---|
| 2013/0335671 A1* | 12/2013 | Fleck | G02B 27/017 349/62 |
| 2013/0335677 A1 | 12/2013 | You | |
| 2014/0151729 A1* | 6/2014 | Orsley | H01L 33/505 257/98 |
| 2014/0192294 A1 | 7/2014 | Chen et al. | |
| 2015/0109560 A1* | 4/2015 | Guo | G02F 1/133617 349/68 |
| 2016/0041429 A1* | 2/2016 | Wang | G02F 1/133553 349/68 |
| 2016/0041450 A1* | 2/2016 | Bennett | G02F 1/35 359/326 |

FOREIGN PATENT DOCUMENTS

| | | |
|---|---|---|
| CN | 103378182 A | 10/2013 |
| CN | 103412435 A | 11/2013 |
| CN | 103472513 A | 12/2013 |
| CN | 104267520 A | 1/2015 |
| CN | 104516149 A | 4/2015 |
| JP | 2004287324 A | 10/2004 |
| KR | 10-2013-0047199 A | 5/2013 |

OTHER PUBLICATIONS

Office Action dated Nov. 18, 2016 issued in corresponding Chines Application No. 201510024239.7.

* cited by examiner

LIQUID CRYSTAL DISPLAY PANEL AND DISPLAY DEVICE

CROSS-REFERENCES TO RELATED APPLICATIONS

This is a National Phase Application filed under 35 U.S.C. 371 as a national stage of PCT/CN2015/081210, filed Jun. 11, 2015, an application claiming priority benefit from Chinese Patent Application No. 201510024239.7, filed to State Intellectual Property Office of the People's Republic of China on Jan. 16, 2015, the entire content of which is incorporated by reference herein.

FIELD OF THE INVENTION

The present invention relates to the field of liquid crystal display technology, in particular to a liquid crystal display panel and a display device.

BACKGROUND OF THE INVENTION

Total reflection type liquid crystal display devices use ambient light for display, and therefore do not require to be provided with a backlight source. Thus, compared with transmission type liquid crystal display devices, the total reflection type liquid crystal display devices consume much less power, which allows the total reflection type liquid crystal display devices to be widely used in display devices that requires relatively low power consumption but requires relatively long endurance time, such as portable outdoor display devices.

Specifically, an existing total reflection type liquid crystal display device includes an array substrate and a color filter substrate assembled in an aligned manner, and liquid crystals filled between the array substrate and the color filter substrate. In general, the array substrate is provided thereon with structures such as a reflecting layer, thin film transistors, pixel electrodes, gate lines, data lines, etc., and the color filter substrate is provided thereon with structures such as a color filter, a black matrix, etc.

The display process of the above-described total reflection type liquid crystal display device is as follows: at first, ambient light passes through the color filter substrate and the liquid crystal layer to reach the reflecting layer; then, after being reflected by the reflecting layer, the light passes through the liquid crystal layer and the color filter substrate again to be emitted to the outside; during this process, by adjusting the deflection angles of liquid crystal molecules in the liquid crystal layer, light transmittance in the liquid crystal layer is adjusted, so that the total reflection type liquid crystal display device displays corresponding images.

It can be known from the above that, when the total reflection type liquid crystal display device displays an image, ambient light needs to pass through the color filter substrate twice. It can be understood that, only a small part of ambient light can pass through the color filter substrate twice and then be emitted out of the total reflection type liquid crystal display device, so as to implement display, which causes the total reflection type liquid crystal display device to have relatively low utilization of ambient light, and leads to a relatively small amount of light emitted from the total reflection type liquid crystal display device to the outside. As a result, an image displayed by the total reflection type liquid crystal display device has insufficient brightness and low contrast ratio.

SUMMARY OF THE INVENTION

The present invention intends to solve at least one of the problems existing in the prior art, and provides a liquid crystal display panel and a display device, and the liquid crystal display panel has a relatively high utilization of ambient light, large brightness and contrast ratio.

To achieve the object of the present invention, there is provided a liquid crystal display panel, which includes a first substrate and a second substrate assembled in an aligned manner, wherein, the liquid crystal display panel further includes a reflecting layer, a light wavelength conversion layer and a quantum dot layer; the reflecting layer is provided on the second substrate, the quantum clot layer is provided on the first substrate or the second substrate and positioned between the reflecting layer and the first substrate; the light wavelength conversion layer is made from an upconversion material and provided between the reflecting layer and the quantum dot layer.

The quantum dot layer includes a plurality of light-emitting regions capable of emitting light of different colors, and each light-emitting region corresponds to one sub-pixel of the liquid crystal display panel.

The quantum dot layer and the light wavelength conversion layer are provided on the second substrate.

The light wavelength conversion layer includes a plurality of sub-conversion layers provided sequentially in a thickness direction of the light wavelength conversion layer, the plurality of sub-conversion layers are configured to sequentially perform multiple conversions on a part of ambient light that has a wavelength in a preset wavelength range and is unable to excite the quantum dot layer to emit light, so as to enable the part of light converted by the plurality of sub-conversion layers to excite the quantum dot layer to emit light.

There are a plurality of light wavelength conversion layers provided sequentially in a thickness direction of the liquid crystal display panel, the plurality of light wavelength conversion layers are configured to respectively convert parts of ambient light that have wavelengths in different wavelength ranges and are unable to excite quantum dots to emit light, so as to enable the parts of light converted by the plurality of light wavelength conversion layers to excite the quantum dot layer to emit light.

Each of the light wavelength conversion layers has a thickness not exceeding 10 μm.

Each of the light wavelength conversion layers has a thickness ranging from 5 nm to 1000 nm.

The liquid crystal display panel further includes a color filter, and the quantum dot layer is positioned between the color filter and the reflecting layer.

The color filter includes multiple types of color units, and each type of color units are provided in areas of the sub-pixels having the same color as said type of color units.

As another technical solution, the present invention further provides a display device including the above-described liquid crystal display panel provided by the present invention.

The present invention has the beneficial effects as follows.

In the liquid crystal display panel provided by the present invention, by using the quantum dot layer, each sub-pixel is enabled to present a corresponding color, and therefore, compared to a solution in the prior art in which a color filter is used to enable the sub-pixels to present different colors, the liquid crystal display panel provided by the present invention allows more ambient light to enter into the liquid crystal layer, be reflected by the reflecting layer and irradiate on the quantum dot layer to excite quantum dots to emit light, thereby implementing display. Therefore, compared to the prior art, the liquid crystal display panel provided by the present invention has a higher utilization of ambient light. Moreover, the liquid crystal display panel provided by the present invention further uses the light wavelength conversion layer to convert long-wavelength light in ambient light into short-wavelength light capable of exciting the quantum dot layer to emit light, in order that the liquid crystal display panel has a further improved utilization of ambient light. Therefore, the liquid crystal display panel provided by the present invention has a higher utilization of ambient light, and thus has higher brightness and contrast ratio.

In the display device provided by the present invention, by using the above-described liquid crystal display panel provided by the present invention, the display device provided by the present invention has a higher utilization of ambient light, and thus has higher brightness and contrast ratio.

BRIEF DESCRIPTION OF THE DRAWINGS

The accompanying drawings, which constitute a part of the description, are used for providing a further understanding of the present invention, and explaining the present invention together with the following specific implementations, rather than limiting the present invention, in which.

REFERENCE NUMERALS

1: first substrate; 2: second substrate; 3: reflecting layer: 4: quantum dot layer: 5: light wavelength conversion layer; 6: color filter; S: liquid crystal layer: 40: light-emitting region; 50, 51 and 52: sub-conversion layer.

DESCRIPTION OF THE PREFERRED EMBODIMENT

The specific implementations of the present invention will be described in detail below with reference to the accompanying drawings. It should be understood that the specific implementations described herein are merely used for describing and explaining the present invention and not intended to limit the present invention.

Figure 1:
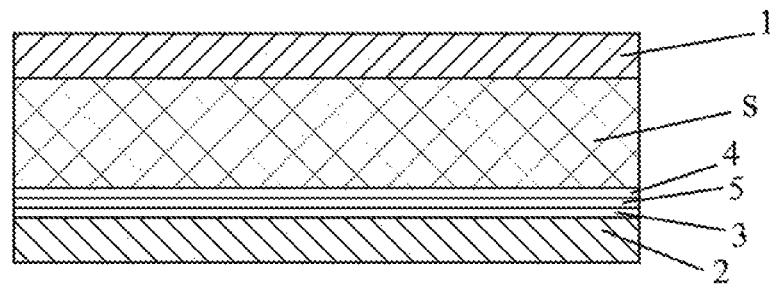
FIG. 1 is a schematic diagram of a first implementation of a liquid crystal display panel provided by the present invention.

Referring to FIG. 1, FIG. 1 is a schematic diagram of a first implementation of a liquid crystal display panel provided by the present invention. In this implementation, the liquid crystal display panel includes a first substrate 1 and a second substrate 2 assembled in an aligned manner and a liquid crystal layer S provided between the first substrate 1 and the second substrate 2. The liquid crystal display panel further includes a reflecting layer 3, a light wavelength conversion layer 5 and a quantum dot layer 4. The reflecting layer 3 is configured to reflect light irradiated thereon, and the quantum dot layer 4 is configured to emit, from an area of the quantum dot layer corresponding to each sub-pixel, light of a corresponding color according to light irradiated thereon; the reflecting layer 3 is arranged on the second substrate 2, and the quantum dot layer 4 is arranged on the first substrate 1 or the second substrate 2 and positioned between the reflecting layer 3 and the first substrate 1 (in other words, the reflecting layer 3 and the quantum dot layer 4 are arranged in a direction from the second substrate 2 to the first substrate 1); the light wavelength conversion layer 5 is made from an upconversion material and provided between the reflecting layer 3 and the quantum dot layer 4. Specifically, the second substrate 2 is arranged inside the liquid crystal display panel, the first substrate 1 is positioned at an outer surface of the liquid crystal display panel, and the outer surface is the display surface of the liquid crystal display panel.

Quantum dots have photoluminescence property, and will emit light of a corresponding color upon being irradiated by light having a certain wavelength (in general, light having a short wavelength and high energy). In the implementation, the quantum dot layer 4 is provided, each area of the quantum dot layer 4 is irradiated by ambient light so that light of a corresponding color can be emitted from an area of the quantum dot layer 4 corresponding to each sub-pixel of the liquid crystal display panel, thus, each sub-pixel presents a corresponding color, and in this way, in the liquid crystal display panel provided by the implementation, sub-pixels can present multiple colors without a color filter.

In the prior art, a color filter is provided to endow sub-pixels with multiple colors. However, the color filter will filter out a majority of ambient light, and only a small part of light can enter into the liquid crystal layer S and be reflected by the reflecting layer, so as to implement display, as a result, the total reflection type liquid crystal display device has low utilization of ambient light, and also has insufficient brightness and contrast ratio. In this implementation, however, the quantum dot layer 4 is used to enable each sub-pixel to present a corresponding color, and it is unnecessary to provide a color filter in the liquid crystal display panel. Compared with the color filter, the quantum dot layer 4 has higher transmittance of ambient light, and therefore, in the liquid crystal display panel provided by the present invention, more ambient light is allowed to enter into the liquid crystal layer S, be reflected by the reflecting layer and then irradiate on the quantum dot layer 4 to excite quantum dots to emit light, thereby implementing display. Therefore, compared to the prior art, the liquid crystal display panel provided by the implementation has a higher utilization of ambient light, and thus has higher brightness and contrast ratio. It should be noted that, in the implementation, the liquid crystal display panel may be of total reflection type or transflective type.

In addition, in the implementation, the light wavelength conversion layer 5 made from an upconversion material is provided between the reflecting layer 3 and the quantum dot layer 4. The upconversion material has a property of converting light having a relatively long, wavelength and relatively low energy into light having a relatively short wavelength and relatively high energy. Therefore, in the implementation, long-wavelength light in ambient light entering into the liquid crystal display panel is converted into short-wavelength light by the light wavelength conversion layer 5, the short-wavelength light goes on to the reflecting layer 3 and is then reflected by the reflecting layer 3, and in this way, the short-wavelength light will again pass through the light wavelength conversion layer 5, the liquid crystal layer S and the quantum dot layer 4. It can be understood that, the short-wavelength light can excite quantum dots to emit light when passing through the quantum dot layer 4. Thus, long-wavelength light in ambient light can finally excite quantum dots to emit light after being subject to the wavelength conversion, so that the liquid crystal display panel has a further improved utilization of ambient light and improved brightness and contrast ratio.

Figure 2:
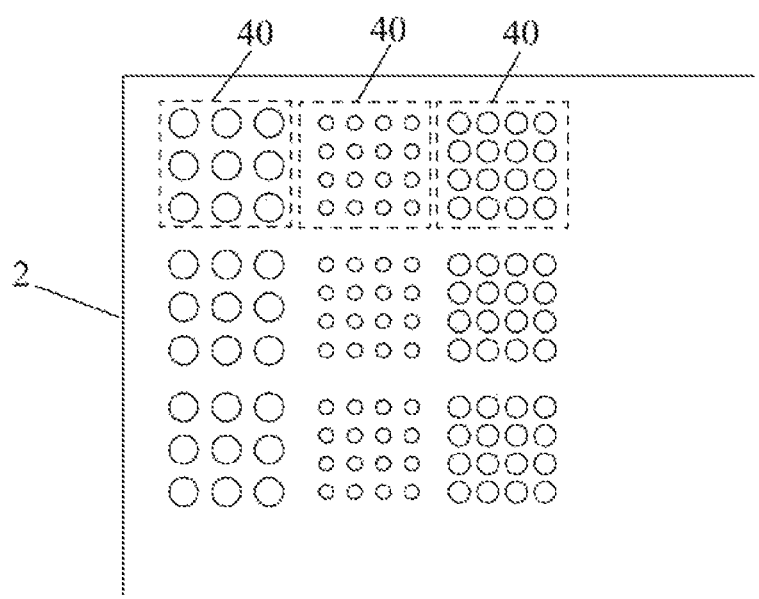
FIG. 2 is a schematic diagram of a quantum dot layer in the liquid crystal display panel shown in FIG. 1.

As shown in FIG. 2, the quantum dot layer 4 includes a plurality of light-emitting regions 40 capable of emitting light of different colors, each light-emitting region 40 corresponds to one sub-pixel of the liquid crystal display panel, and quantum dots in each light-emitting region 40 emit light having the same color as the corresponding sub-pixel when being irradiated by light. Specifically, as shown in FIG. 2, quantum dots in the light-emitting regions 40 corresponding to sub-pixels of different colors have different sizes, so that quantum dots in the light-emitting regions 40 corresponding to sub-pixels of different colors emit light having different colors when being irradiated by ambient light. In this case, the quantum dots in each light-emitting region 40 may be made of the same material. Needless to say, different materials may be adopted to manufacture the quantum dots in the light-emitting regions 40 corresponding to sub-pixels of different colors, so that the quantum dots in different light-emitting regions 40 emit light of different colors when being irradiated by ambient light, and in this case, the quantum dots in every light-emitting region 40 may have the same size.

Specifically, the light wavelength conversion layer 5 may be arranged on the first substrate 1 or the second substrate 2, as long as the light wavelength conversion layer 5 is positioned between the reflecting layer 3 and the quantum dot layer 4. Preferably, the quantum dot layer 4 and the light wavelength conversion layer 5 are arranged on the second substrate 2, so that light emitted from the quantum dot layer 4 can pass through the liquid crystal layer before being emitted to the outside.

Figure 3:
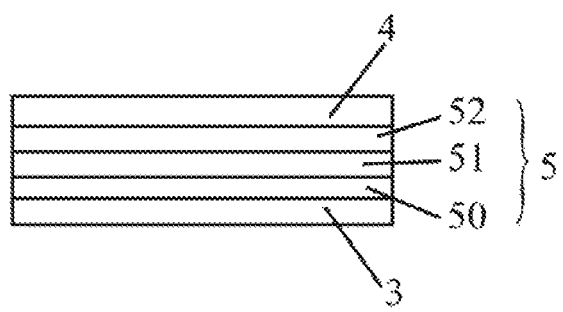
FIG. 3 is a schematic diagram of a light wavelength conversion layer including a plurality of sub-conversion layers.

In the implementation, as shown in FIG. 3, the light wavelength conversion layer 5 includes a plurality of sub-conversion layers provided sequentially in a thickness direction of the light wavelength conversion layer 5, the plurality of sub-conversion layers are configured to perform, in proper order, multiple conversions on a part of ambient light, which has a wavelength in a preset wavelength range and is unable to excite the quantum dot layer to emit light so that the part of ambient light which has a wavelength in the preset wavelength range and is unable to excite the quantum dot layer to emit light becomes capable of exciting the quantum dot layer to emit light after being converted by the plurality of sub-conversion layers. For example, if light capable of exciting the quantum dot layer 4 to emit light has a wavelength in the range of less than 450 nm, in order to enable the light wavelength conversion layer 5 to convert light having a wavelength in the range of 700 nm to 750 nm into light capable of exciting the quantum dot layer 4 to emit light, the light wavelength conversion layer 5 may include three sub-conversion layers (i.e., sub-conversion layers 50, 51 and 52). In this case, the sub-conversion layer 52 may convert light having a wavelength in the range of 700 nm to 750 nm into light having a wavelength in the range of 600 nm to 650 nm, the light having a wavelength in the range of 600 nm to 650 nm then enters into the sub-conversion layer 51; the sub-conversion layer 51 further converts the light having a wavelength in the range of 600 nm to 650 nm into light having a wavelength in the range of 500 nm to 550 nm, the light having a wavelength in the range of 500 nm to 550 nm then enters into the sub-conversion layer 50; in the sub-conversion layer 50, the wavelength of the light is further converted into a wavelength in the range of 400 nm to 450 nm by the sub-conversion layer 50, and thus light wavelength conversion layer 5 can convert the light having a wavelength in the range of 700 nm to 750 nm into light capable of exciting the quantum dot layer 4 to emit light.

In the implementation, there may be a plurality of light wavelength conversion layers 5 provided sequentially in a thickness direction of the liquid crystal display panel, the plurality of light wavelength conversion layers 5 are configured to respectively convert parts of ambient light that have wavelengths in different wavelength ranges and are unable to excite the quantum dots to emit light so that the parts of ambient light that have wavelengths in different wavelength ranges and are unable to excite the quantum clots to emit light becomes capable of exciting the quantum dot layer 4 to emit light after being converted by the plurality of light wavelength conversion layers. For example, the number of the light wavelength conversion layers 5 may be three, and the three different light wavelength conversion layers 5 may convert light having a wavelength in the range of 700 nm to 750 nm, light having a wavelength in the range of 600 nm to 650 nm and light having a wavelength in the range of 500 nm to 550 nm into light having a wavelength less than 450 nm and capable of exciting the quantum dot layer 4 to emit light, respectively. It can be understood that, in this case, each light wavelength conversion layer 5 may includes a plurality of sub-conversion layers, and multiple conversions are performed successively by the plurality of sub-conversion layers, so as to convert light having a relatively long wavelength into light having a relatively short wavelength and capable of exciting the quantum dot layer 4 to emit light.

Preferably, the light wavelength conversion layer 5 has a thickness not exceeding 10 μm. It can be understood that, as the thickness of the light wavelength conversion layer 5 increases, the transmittances of long-wavelength light and short-wavelength light in the light wavelength conversion layer 5 decrease, whereas the conversion ratio from long-wavelength light to short-wavelength light increases; as the thickness of the light wavelength conversion layer 5 decreases, the transmittances of long-wavelength light and short-wavelength light in the light wavelength conversion layer 5 increase, whereas the conversion ratio from long-wavelength light to short-wavelength light decreases. In practice, the thickness of the light wavelength conversion layer 5 is determined according to requirements on transmittance of light in the light wavelength conversion layer 5 and conversion ratio from long-wavelength light to short-wavelength light. Specifically, based on the above principle, the thickness of the light wavelength conversion layer 5 may be set in the range of 5 nm to 1000 nm.

Figure 4:
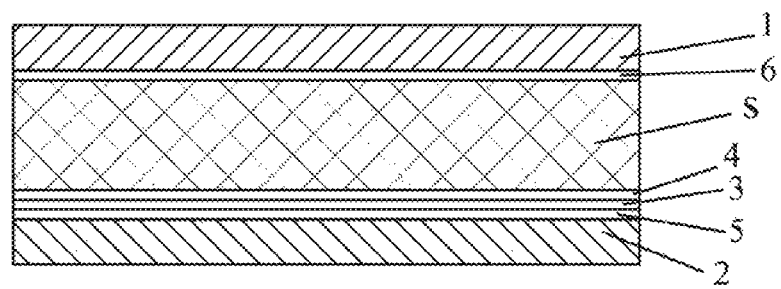
FIG. 4 is a schematic diagram of a second implementation of a liquid crystal display panel provided by the present invention.

Referring to FIG. 4, FIG. 4 is a schematic diagram of a second implementation of a liquid crystal display panel provided by the present invention. Based on the above first implementation, the liquid crystal display panel provided by the implementation further includes a color filter 6, and the quantum dot layer 4 is positioned between the color filter 6 and the reflecting layer 3. The color filter 6 includes color units of multiple colors, and each color unit is provided in an area of the sub-pixel having the same color as the color unit.

It can be understood that, in the above first implementation, a part of long-wavelength light is not converted into short-wavelength light by the light wavelength conversion layer 5, and a part of short-wavelength light does not excite quantum dots to emit light, and the part of long-wavelength light and the part of short-wavelength light are also emitted to the outside, which may cause color aberration in sub-pixels of the liquid crystal display panel.

In this implementation, in each area of the sub-pixel, a color unit (generally a resin film having a specified color) having the same color as the sub-pixel is provided, the color unit only allows light having the same color as the sub-pixel to pass therethrough, and filters out light having a color different from that of the sub-pixel. In this way, color displayed in each pixel of the liquid crystal display panel is accurate, and the liquid crystal display panel has a good display effect.

It can be understood that, because the color filter 6 is only configured to filter out long-wavelength light and a part of short-wavelength light, compared to the prior art, the color filter 6 may have a relatively small thickness, so as not to lower the ambient light utilization of the liquid crystal display panel.

In summary, in the liquid crystal display panel provided by the above implementation of the present invention, by using the quantum dot layer 4, each sub-pixel is enabled to present a corresponding color, and therefore, compared to a solution in the prior art in which a color filter is used to enable the sub-pixels to present different colors, more ambient light can be allowed to enter into the liquid crystal layer, be reflected by the reflecting layer 3 and irradiate on the quantum dot layer 4 to excite quantum dots to emit light, so as to implement display. Therefore, compared to the prior art, the liquid crystal display panel provided by the present invention has a higher utilization of ambient light. Moreover, the liquid crystal display panel provided by the present invention further uses the light wavelength conversion layer 5 to convert long-wavelength light in ambient light into short-wavelength light capable of exciting the quantum dot layer to emit light, in order that the liquid crystal display panel has a further improved utilization of ambient light. Therefore, the liquid crystal display panel provided by the present invention has a higher utilization of ambient light, and thus has higher brightness and contrast ratio.

As another technical solution, the present invention further provides a display device, which includes the liquid crystal display panel provided by the above implementation of the present invention.

In the display device provided by the implementation, by using the liquid crystal display panel provided by the above implementation of the present invention, the display device has a higher utilization of ambient light, and thus has higher brightness and contrast ratio.

It could be understood that the foregoing implementations are merely exemplary implementations for describing the principle of the present invention, but the present invention is not limited thereto. A person of ordinary skill in the art may make various modifications and improvements without departing from the spirit and essence of the present invention, and these modifications and improvements shall fall into the protection scope of the present invention.

The invention claimed is:

1. A liquid crystal display panel, comprising a first substrate and a second substrate assembled in an aligned manner, wherein, the liquid crystal display panel further comprises a reflecting layer, a light wavelength conversion layer and a quantum dot layer;

the reflecting layer is provided on the second substrate, and the quantum dot layer is provided on the first substrate or the second substrate and positioned between the reflecting layer and the first substrate; and the light wavelength conversion layer is made from an upconversion material and provided between the reflecting layer and the quantum dot layer;

wherein the light wavelength conversion layer comprises a plurality of sub-conversion layers provided sequentially in a thickness direction of the light wavelength conversion layer, and the plurality of sub-conversion layers are configured to sequentially perform multiple conversions on a part of ambient light that has a wavelength in a preset wavelength range and is unable to excite the quantum dot layer to emit light, so as to enable the part of light converted by the plurality of sub-conversion layers to excite the quantum dot layer to emit light.

2. The liquid crystal display panel according to claim 1, wherein the quantum dot layer comprises a plurality of light-emitting regions capable of emitting light of different colors, and each light-emitting region corresponds to one sub-pixel of the liquid crystal display panel.

3. The liquid crystal display panel according to claim 1, wherein the quantum dot layer and the light wavelength conversion layer are provided on the second substrate.

4. The liquid crystal display panel according to claim 1, wherein each light wavelength conversion layer has a thickness not exceeding 10 μm.

5. The liquid crystal display panel according to claim 4, wherein each light wavelength conversion layer has a thickness ranging from 5 nm to 1000 nm.

6. The liquid crystal display panel according to claim 1, further comprising a color filter, wherein the quantum dot layer is positioned between the color filter and the reflecting layer.

7. The liquid crystal display panel according to claim 6, wherein the color filter comprises multiple types of color units, and each type of color units are provided in areas of sub-pixels having the same color as said type of color units.

8. A display device, comprising a liquid crystal display panel according to claim 1.

9. The display device according to claim 8, wherein the quantum dot layer comprises a plurality of light-emitting regions capable of emitting light of different colors, and each light-emitting region corresponds to one sub-pixel of the liquid crystal display panel.

10. The display device according to claim 8, wherein the quantum dot layer and the light wavelength conversion layer are provided on the second substrate.

11. The display device according to claim 8, wherein each light wavelength conversion layer has a thickness not exceeding 10 μm.

12. The display device according to claim 11, wherein each light wavelength conversion layer has a thickness ranging from 5 nm to 1000 nm.

13. The display device according to claim 8, further comprising a color filter, wherein the quantum dot layer is positioned between the color filter and the reflecting layer.

14. The display device according to claim 13, wherein the color filter comprises multiple types of color units, and each type of color units are provided in areas of sub-pixels having the same color as said type of color units.

15. The display device according to claim 8, further comprising a liquid crystal layer provided between the first substrate and the second substrate, wherein the reflecting layer, the light wavelength conversion layer and the quantum dot layer are provided at a same side of the liquid crystal layer.

16. The liquid crystal display panel according to claim 1, further comprising a liquid crystal layer provided between the first substrate and the second substrate, wherein the reflecting layer, the light wavelength conversion layer and the quantum dot layer are provided at a same side of the liquid crystal layer.

17. A liquid crystal display panel, comprising a first substrate and a second substrate assembled in an aligned manner, wherein, the liquid crystal display panel further comprises a reflecting layer, a light wavelength conversion layer and a quantum dot layer;
  the reflecting layer is provided on the second substrate, and the quantum dot layer is provided on the first substrate or the second substrate and positioned between the reflecting layer and the first substrate; and
  the light wavelength conversion layer is made from an upconversion material and provided between the reflecting layer and the quantum dot layer;
  wherein there are a plurality of light wavelength conversion layers provided sequentially in a thickness direction of the liquid crystal display panel, and the plurality of light wavelength conversion layers are configured to respectively convert parts of ambient light that have wavelengths in different wavelength ranges and are unable to excite quantum dots to emit light, so as to enable the parts of light converted by the plurality of light wavelength conversion layers to excite the quantum dot layer to emit light.

18. A display device, comprising a liquid crystal display panel, which comprises a first substrate and a second substrate assembled in an aligned manner, wherein, the liquid crystal display panel further comprises a reflecting layer, a light wavelength conversion layer and a quantum dot layer;
  the reflecting layer is provided on the second substrate, and the quantum dot layer is provided on the first substrate or the second substrate and positioned between the reflecting layer and the first substrate; and
  the light wavelength conversion layer is made from an upconversion material and provided between the reflecting layer and the quantum dot layer;
  wherein there are a plurality of light wavelength conversion layers provided sequentially in a thickness direction of the liquid crystal display panel, and the plurality of light wavelength conversion layers are configured to respectively convert parts of ambient light that have wavelengths in different wavelength ranges and are unable to excite quantum dots to emit light, so as to enable the parts of light converted by the plurality of light wavelength conversion layers to excite the quantum dot layer to emit light.

* * * * *